United States Patent
Likar et al.

(10) Patent No.: US 10,887,804 B2
(45) Date of Patent: Jan. 5, 2021

(54) PRE-ROAMING SECURITY KEY DISTRIBUTION FOR FASTER ROAMING TRANSITIONS OVER CLOUD-MANAGED WI-FI NETWORKS OF HETEROGENEOUS IP SUBNETS

(71) Applicant: Cloudmondo, Inc., Santa Clara, CA (US)

(72) Inventors: Bojan Likar, Cupertino, CA (US); Ihab Abu-Hakima, Los Altos, CA (US)

(73) Assignee: NEUTRINO8, INC., Santa Clara, CA (US)

( * ) Notice: Subject to any disclaimer, the term of this patent is extended or adjusted under 35 U.S.C. 154(b) by 0 days.

(21) Appl. No.: 15/390,426

(22) Filed: Dec. 23, 2016

(65) Prior Publication Data

US 2018/0184345 A1    Jun. 28, 2018

(51) Int. Cl.

| | |
|---|---|
| H04W 36/08 | (2009.01) |
| H04W 12/08 | (2009.01) |
| H04W 84/12 | (2009.01) |
| H04L 29/06 | (2006.01) |
| H04W 12/04 | (2009.01) |
| H04W 12/06 | (2009.01) |
| H04W 36/00 | (2009.01) |

(52) U.S. Cl.
CPC ............ *H04W 36/08* (2013.01); *H04L 63/06* (2013.01); *H04W 12/0401* (2019.01); *H04W 12/04031* (2019.01); *H04W 12/0602* (2019.01); *H04W 12/08* (2013.01); *H04W 84/12* (2013.01); *H04W 36/0077* (2013.01)

(58) Field of Classification Search
CPC ..... H04W 36/09; H04W 12/04; H04W 12/08; H04W 84/12; H04W 36/08; H04W 36/0077; H04W 12/0401; H04W 12/04031; H04W 12/0602; H04L 61/2007; H04L 63/06
See application file for complete search history.

(56) References Cited

U.S. PATENT DOCUMENTS

| | | | |
|---|---|---|---|
| 2006/0256763 A1* | 11/2006 | Nguyen | H04L 63/06 370/338 |
| 2010/0241854 A1 | 9/2010 | Yao et al. | |
| 2016/0212695 A1* | 7/2016 | Lynch | H04W 48/08 |

\* cited by examiner

*Primary Examiner* — Jianye Wu
(74) *Attorney, Agent, or Firm* — Law Office of Dorian Cartwright; Dorian Cartwright

(57) ABSTRACT

A cloud control element distributes security keys prior to roaming to facilitate fast transition roaming across different IP subnets. The cloud control element distributes security keys to access points identified as neighboring and sharing a common SSID (service set identifier), but over different IP subnets. The security keys embed information related to authentication by stations for a specific SSID. Responsive to connecting with a specific wireless station roaming to a target access point from a source access point, fast transition by way of a security key is utilized to authenticate the specific wireless station without a full authentication protocol through a RADIUS server.

13 Claims, 9 Drawing Sheets

PRE-ROAMING SECURITY KEY DISTRIBUTION FOR FASTER ROAMING TRANSITIONS OVER CLOUD-MANAGED WI-FI NETWORKS OF HETEROGENEOUS IP SUBNETS

FIELD OF THE INVENTION

The invention relates generally to computer networking, and more specifically, to utilizing security key distribution prior to roaming for faster roaming transitions over a cloud-managed Wi-Fi network of heterogeneous subnets.

BACKGROUND

Users are continuing to demand mobile computing with easier use and better performance, in a ubiquitous manner. Untethered networking, under the IEEE 802.11 protocols promulgated by the Institute of Electrical and Electronics Engineers, is typically enabled by an access point having a Wi-Fi network interface that can exchange data with a Wi-Fi network interface of mobile computers, within a limited range as determined by the physical constraints of radios and antennae. Mobile, untethered networking, corresponding to user movements, can cause hand-offs from a first access point to a second access point as mobile computers roam from one Wi-Fi radio range to another and continue network service.

Unfortunately, performance typically degrades during these handoffs, because of the need for the mobile computer to again associate with the new access point, and to again authenticate to a RADIUS server. Consequently, delay sensitive applications such as VOIP or video can freeze during conventional handovers.

Some advancements provide for faster roaming within a homogeneous network of access points. In one example, the IEEE 802.11r protocol specifies hand-off process that eliminates parts of the security protocol because both the source access point and the target access point are within the same network. Therefore, the target access point gives full faith and credit to the security protocol already performed by the source access point.

Unfortunately, when access points are on separate IP subnets, security cannot be guaranteed through conventional fast roaming techniques because of, for example, intervening network devices such as firewalls or routers enforcing different network policies. Consequently, a new security key may be necessary.

What is needed is a robust technique to facilitate faster transitions when roaming over a cloud-managed Wi-Fi network of heterogeneous IP subnets.

SUMMARY

The shortcomings of the prior art are addressed by methods, (non-transitory) computer program products, and systems for utilizing security key distribution prior to roaming for faster transitions when roaming between heterogeneous subnets over a cloud-managed Wi-Fi network, as described herein.

In one embodiment, an SSID (service set identifier) is associated with a target access point disposed within a first IP subnet. A cloud control element stores a security key, specific to a station on an SSID, for fast transition to the target access point. The security key is distributed prior to roaming of wireless stations in order to speed up the reassociation/reauthentication to continue network access.

The security key can be received by a target access point from a source access point disposed on a different IP subnet.

In another embodiment, the source access point can be identified by the target access point a neighboring access points that is capable of being a source for roaming wireless stations by periodically scanning for neighboring access points within radio range that share the same SSID. Responsive to identifying the source access point, a security key is received from the control element for the target source access point in preparation for roaming wireless stations.

Responsive to connecting with a specific wireless station roaming to the target access point from the source access point, fast transition by way of the security key is utilized to authenticate the specific wireless station without a full authentication protocol of generating a new security key and/or authenticating with a RADIUS server, as is the case when first associating/authenticating with the cloud-managed Wi-Fi network.

Advantageously, computer performance is enhanced because mobile stations have experience faster transition times across IP subnets and improve quality of service for users. The above summary represents just some aspects of the following detailed description of several embodiments.

BRIEF DESCRIPTION OF THE DRAWINGS

In the following figures, like reference numbers are used to refer to like elements. Although the following figures depict various examples of the invention, the invention is not limited to the examples depicted in the figures.

DETAILED DESCRIPTION

Methods, (non-transitory) computer program products, and systems for utilizing fast transition roaming protocols over heterogeneous IP subnets, as described herein. One of ordinary skill in the art will recognize several variations from the embodiments described herein that are within the spirit and scope of the disclosure.

I. Systems for Fast Transition Roaming Over Heterogeneous IP Subnets (FIGS. 1-5)

Figure 1A:
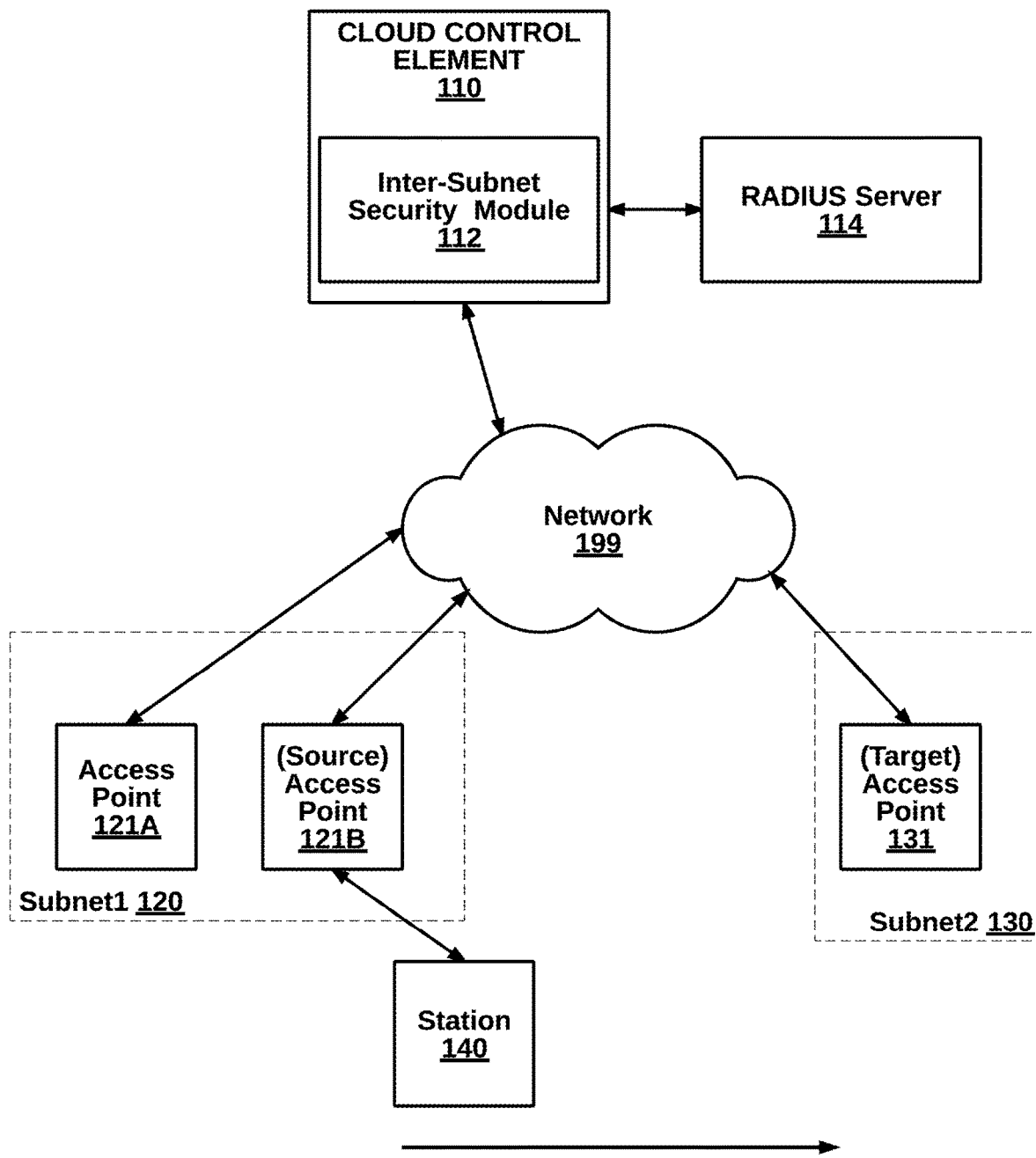
FIGS. 1A & 1B are high-level block diagram illustrating system architectures for fast transition roaming over heterogeneous IP subnets, according to an embodiment of the present disclosure.

FIG. 1A is a high-level block diagram illustrating a system 100 to utilize fast transition roaming protocols over heterogeneous IP subnets, prior to roaming, according to one embodiment. The system 100 includes, a cloud control element 110, a first IP subnet 120, a second IP subnet 130, and station 140. The components can be implemented in hardware, software, or a combination. Compare against FIG. 1B which shows the system 100 after the station 140 roams between IP subnets. The system 100 is merely an example of many possible configurations which could include more or less access points, control elements, stations, and can also include well known components such as routers, switches, and firewalls.

A network 199 couples the components in communication for data transfers in the form of frames. Some components are preferably wired to the network 199 (e.g., cloud control element 110, access points 121A,B, 131 and firewall 101). The station 140 is wireless connects to the access points 121A,B, 131 on a Wi-Fi portion of the system 100. The network 199 can be a LAN, WAN, the Internet, a cloud-based network, a data network, a cellular network, a hybrid network, or the like.

The cloud control element 110 includes an internet-subnet security module 112 that distributes security keys for stations prior to roaming by the stations. The security key can be a general key used to derive a specific key, a key that is specific to a source access point, or a key that is specific to the station 140 and the SSID. The cloud control element 110 can be disposed external to both IP subnets 120, 130 or within either of IP subnets 120, 130. When the APs 121A,B, 131 boot up (or as configured), the internet-subnet security module 112 receives results of a neighbor scan that reveals nearby access points and, in particular, which neighboring access points share an SSID. The shared SSID is indicative of common ownership, in some embodiments. For example, communication from the access point 121B could reveal the access points 121A and 131 as neighboring. Because the internet-subnet security module 112 recognizes access point 131 as being a member of a different IP subnet, one or more security keys for stations are automatically provided to the access point 131 to allow fast transitions when those associated stations roam.

Additional analysis can also predict whether a station will roam and condition a corresponding security key distribution on the additional analysis in part or in whole. Some embodiments also automatically provide a security key to the access point 131 in preemption of its own neighborhood scan that would discover the access point 121B as a reciprocal neighbor. More detailed embodiments of the cloud control element 110 are set forth with respect to FIG. 2 and methods described below.

The second IP subnet 130 can be a logical subdivision of an IP network between devices behind the firewall 101. The first and second subnets 120, 130 are preferably owned and/or controlled by the same entity, customer or client, as recognized by the internet-subnet security module 112. But in one embodiment, the first and second subnets 120, 130 are associated with different user accounts of different customers, and have been specifically linked together to allow fast transitions between access points of different entities. Computers that belong to a subnet are addressed with a common, identical, most-significant bit-group in their IP address. This results in the logical division of an IP address into two fields, a network or routing prefix and the rest field or host identifier. The rest field is an identifier for a specific host or network interface. The firewall 101, in some embodiments, prevents a secure connection across IP subnets.

The access points 121A,B and 131 service mobile stations while within radio range and facilitate fast transitions for roaming between access points over different IP subnets. More specifically, the access points 121A,B and 131 perform neighbor scans to discover nearby access points and determine whether an associated SSID is in common. Shared SSIDs allow stations to move between stations without configuring for a new SSID. In response, the cloud control element 110 provides security keys for out of IP subnet access points so that roaming stations can quickly reassociate.

In one embodiment, a security key is generated by one of the access points 121A,B and 131 and sent to the cloud control element 110 whenever an access point first associates with the network. Key generation can be configured for power up, boot up/reboot, reset, upon request, at predetermined times, based on number of connected stations, based on processing load, or the like. One embodiment utilizes a station-specific key that is generated when stations first associate with the network. Security keys are uploaded to the cloud control element 110 for storage and distribution to neighbors through a secure channel.

By contrast, an initial association/authentication involves authentication to a RADIUS server 114 and generation of one or more security keys. The RADIUS server 114 can check username and/or password. To generate security keys during an initial association, a 4-way handshake is necessary before data can be transmitted in a secure manner. In some cases, security is based on IEEE 802.1X authentication and dynamic encryption keys distributed through the Extensible Authentication Protocol (EAP). Some embodiments of the present technique bypass the 4-way handshake (i.e., pairwise key exchange) or other authentication protocol during a reauthentication due to roaming between access points of varying IP subnets, but of the same SSID. Advantageously, generation of a new security key and/or authentication to the RADIUS server 114 is not necessary for reassociation/reauthentication.

The station 140 exchanges data with the network 199 via at least one of the access points 121A,B and 131. The station 140 can autonomously trigger a hand-off to different access point, or be forced to do so when access points discontinue a connection. A hand-off to a different access point can be initiated responsive to a stronger RSSI (receive signal strength indicator) relative to a current connection, lag in response time, location coordinates, responsive to user instructions, application requests, performance issues, or the like. The station 140 initiates connections with nearby access points as determined from beacons broadcast by access points to advertise availability to stations. The beacons include an SSID which is embedded in a connection request frame to start the connection sequence. In some embodiments, applications executing on the station 140, such as a browser or a video game, can request data from, and send data to, a remote server.

More generally, the components of system 100 can be, for example, a personal computer, a laptop computer, a tablet computer, a smart phone, a mobile computing device, an Internet appliance, a non-wireless device modified to have wireless capabilities, any other appropriate processor-driven computing device (see e.g., FIG. 6), a process, or a virtual device.

Figure 1B:
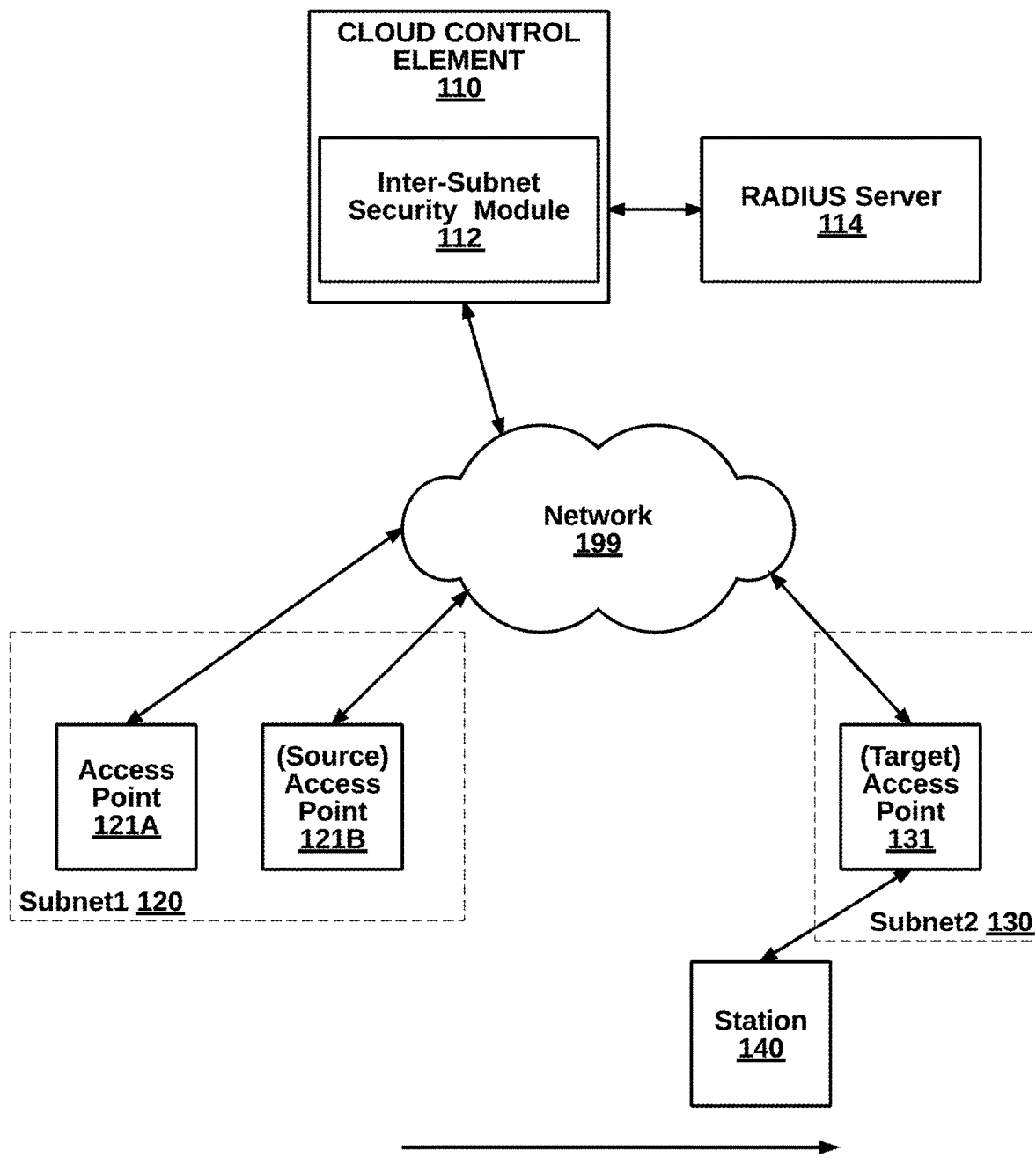
Figure 2:
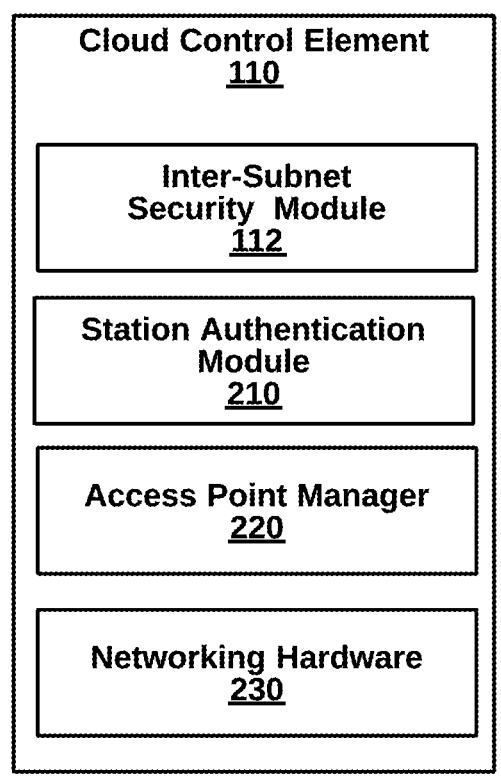
FIG. 2 is a more detailed block diagram illustrating a cloud control element module of FIG. 1, according to one embodiment.

FIG. 2 is a more detailed block diagram illustrating the cloud control element 110 of FIGS. 1A and 1B, according to one embodiment. The cloud control element 110 comprises the inter-subnet security module 112, a station authentication module 210, an access point manager 220 and networking hardware 230. Alternative embodiments are possible.

The station authentication module 210 ensures the identity of network devices joining the network. Depending on whether the station 140 is associating or reassociating, different authentication modes are activated. In particular, a first mode for the full authentication process involving security key generation and the RADIUS server 114 occurs when the station 140 first joins the network. A second mode for the fast transition roaming authentication process, bypassing the security key generation and/or the RADIUS server 114, occurs when the station 140 is rejoining the network of a common SSID, even though the station 140 moves across IP subnets that typically require authentication through the RADIUS server 114.

The inter-subnet security module 112 synchronizes security keys between neighboring access points of distinct IP subnets and common SSIDs. Rather than establishing a secure channel through reauthentication via the authentication module 210, security keys received from access points during boot up processes or at other times are stored and distributed to neighboring access points, preferably prior to actual hand-offs by associated stations. For intra-subnet neighboring access points within a common IP subnet, some embodiments of the inter-subnet security module 220 are not involved in the transfer process which is handled locally by access points.

The access point manager 220 monitors access points under its purview and sends instructions to configure location access point operations. In one case, a single entity or user controls the access point manager 220 and the access points being managed. In another case, multiple entity or users have separate accounts on a 3rd party service hosted by the access point manager 220. One or more SSIDs are assigned to access points, and stations are associated and disassociated, per network-wide policies established automatically, by default, or by users. For example, all stations can be required to fully authenticate even after roaming responsive to certain security breaches. Individual stations serviced by access points can also be directly controlled. For example, stations can be forcibly handed-off to another access point, or can be restricted with respect to network usage.

The networking hardware 230 can comprise networking interface components such as Wi-Fi radios, Wi-Fi antennae, transceivers, coders and decoders, digital signal processors, and other supporting lower level hardware and processes necessary for communication across channels. The networking hardware 230 can support different variations of IEEE 802.11, including multiple input/multiple output (MIMO) and other techniques.

Figure 3:
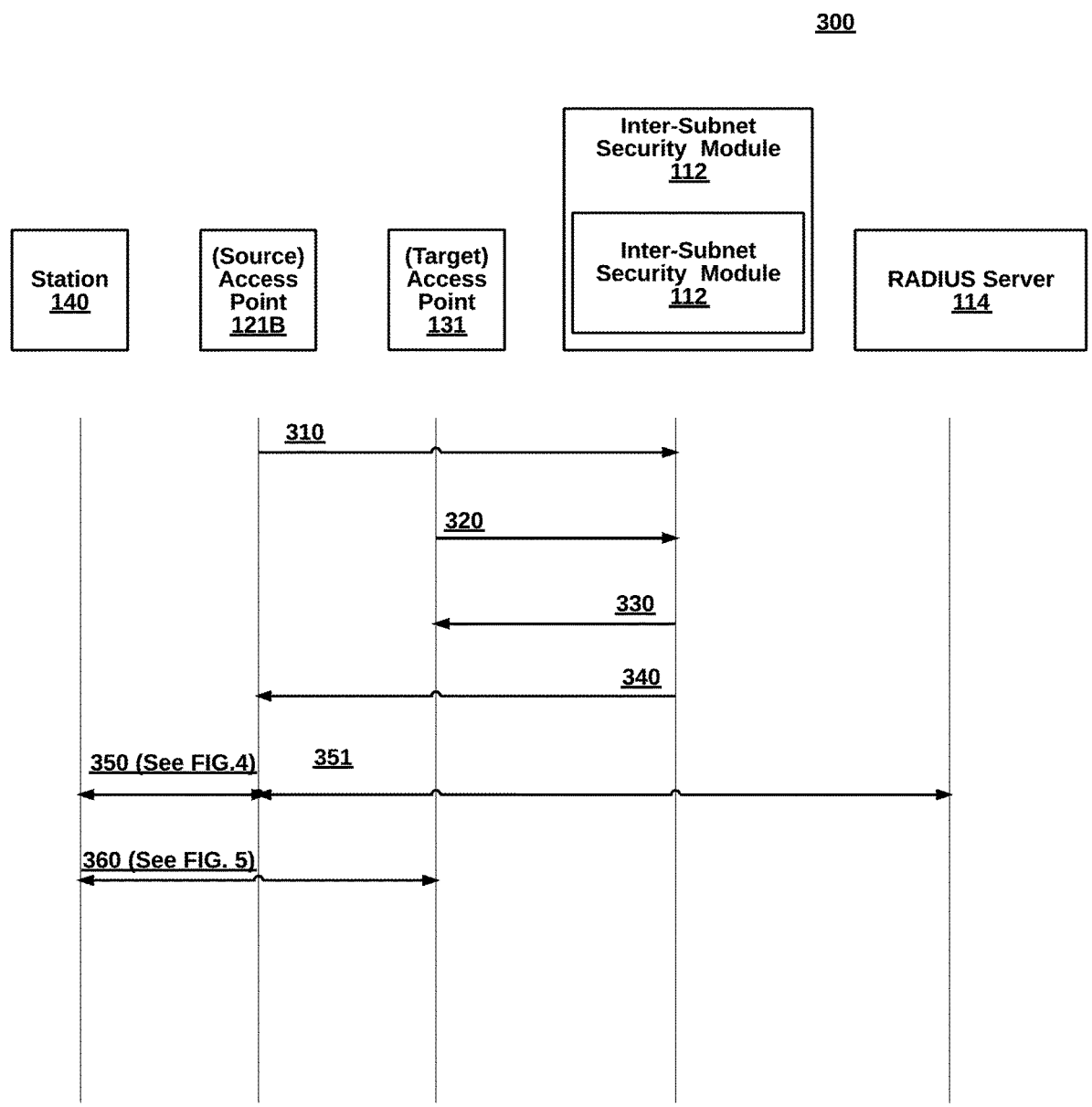
FIGS. 3-5 are interaction diagrams illustrating sequences of messages exchanged during key distribution and fast transition roaming, according to an embodiment.
Figure 4:
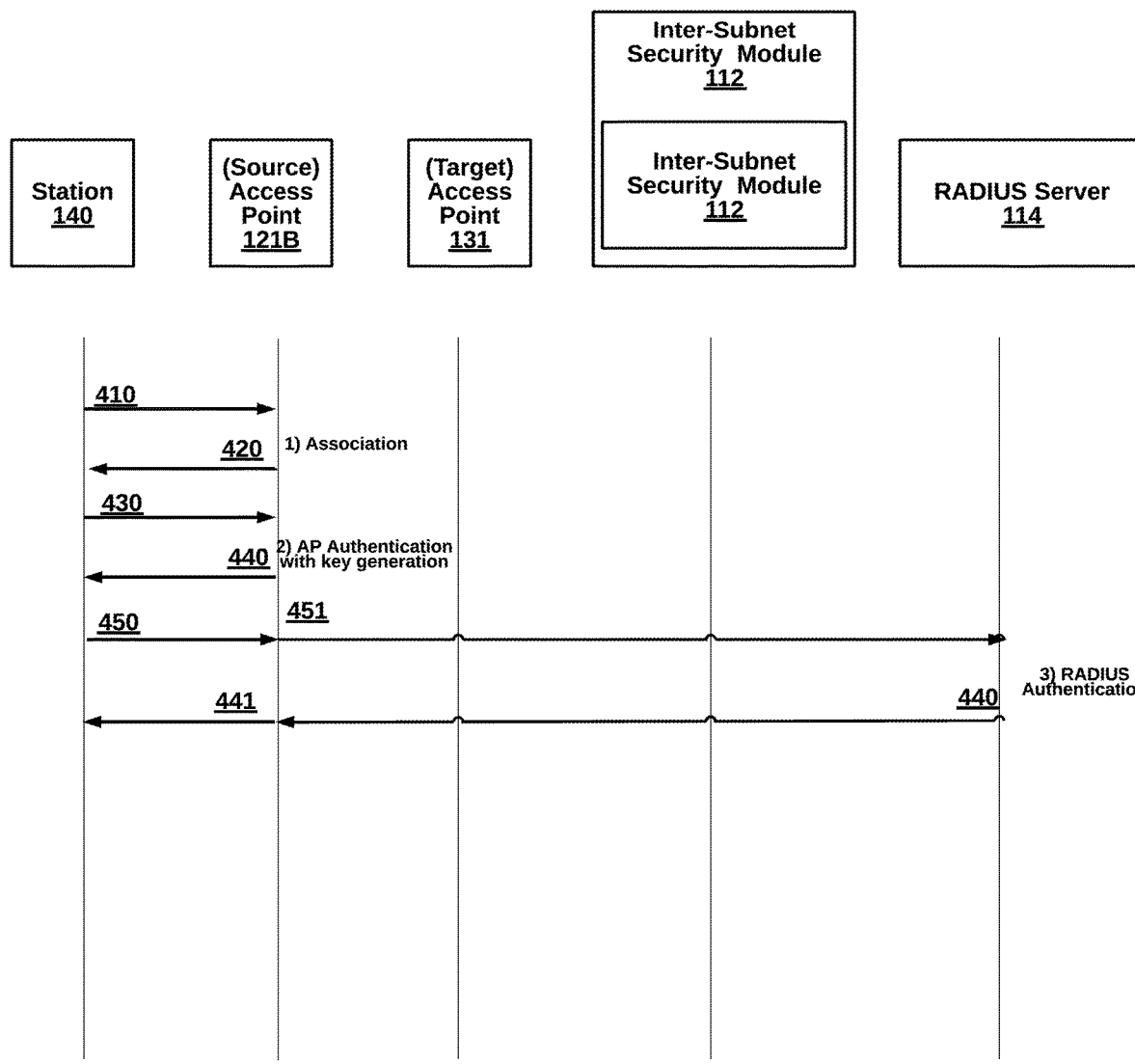
Figure 5:
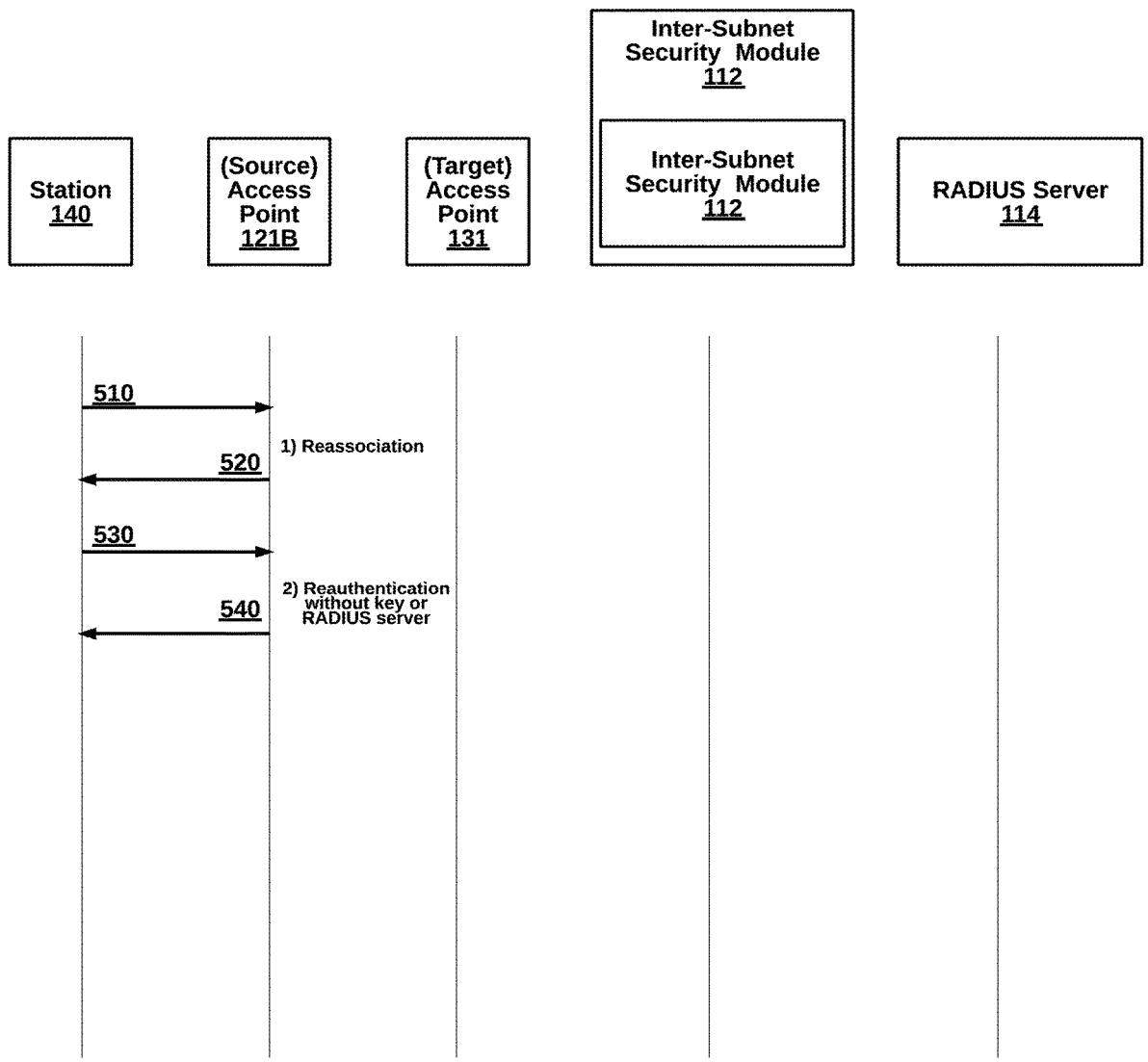

FIGS. 3-5 are interaction diagrams illustrating messages exchanged during roaming, according to an embodiment. The overall message sequence for key distribution of the current embodiment is shown in FIG. 4 while details of the initial association/authentication sequence are shown in FIG. 5 and of the reassociation/reauthentication sequence in FIG. 6. Several interactions can be performed in different orders, be broken in to sub-interactions, be combined into aggregate interactions, or include additional interactions (e.g., disassociation interactions). Moreover, some communication arrows shown in a single direction to emphasize parts of the sequence, but may not be limited to communication in the single direction.

First, the (source) access point 121B and the (destination) access point 131 notify the cloud control element 110 of availability (interactions 310 and 320). Assuming that the access point 131 is the latter to send the notification, the cloud control element 110 responds to the access point 131 with one or more security keys for the access point 121B (and keys for other access points (interaction 330)), and then updates the access point 121B with one or more security keys for the access point 131 (interaction 340). Next, the station 140 associates with the access point 121B (interaction 350) and authenticates with the RADIUS server 114 through the access point 121B (interaction 351), and then roams to reauthenticate and reassociate with the access point 131 (interaction 360), as described more fully with regards to FIGS. 4 and 5, respectively.

Specifically, the sub-interaction sequence of interaction 310 includes an association request to (interaction 410) and an association response from the access point 121B (interaction 420), including generation of a security key (e.g. by using the 4-way handshake). By contrast, the authentication is passed through the access point 121B in some embodiments, to a back end RADIUS server. An authentication request sent from the station 140 to the access point 121B as a proxy for the RADIUS server (interaction 430). In response to an identify request, the station 140 sends a user name which is passed to the RADIUS server (interaction 440). Then, in response to an authentication challenge originating from the station, the RADIUS server sends an authentication response passed through the access point 121B (interaction 450). Finally, the station sends an indication of successful authentication (interaction 316).

Moreover, in the sub-interaction sequence of the interaction 320 includes the similar steps but without the RADIUS authentication. Instead, an association request to (interaction 510) and an association response from (interaction 520) the access point 131 is exchanged, without the need for generating a security key because security keys are distributed prior to actual roaming, in some cases. Then, an authentication request is sent to (interaction 530) and received from (interaction 540) the access point 131, without the need for the RADIUS server 114, in some embodiments.

II. Methods for Fast Transition During Roaming Over Heterogeneous IP Subnets (FIGS. 6-7)

Figure 6:
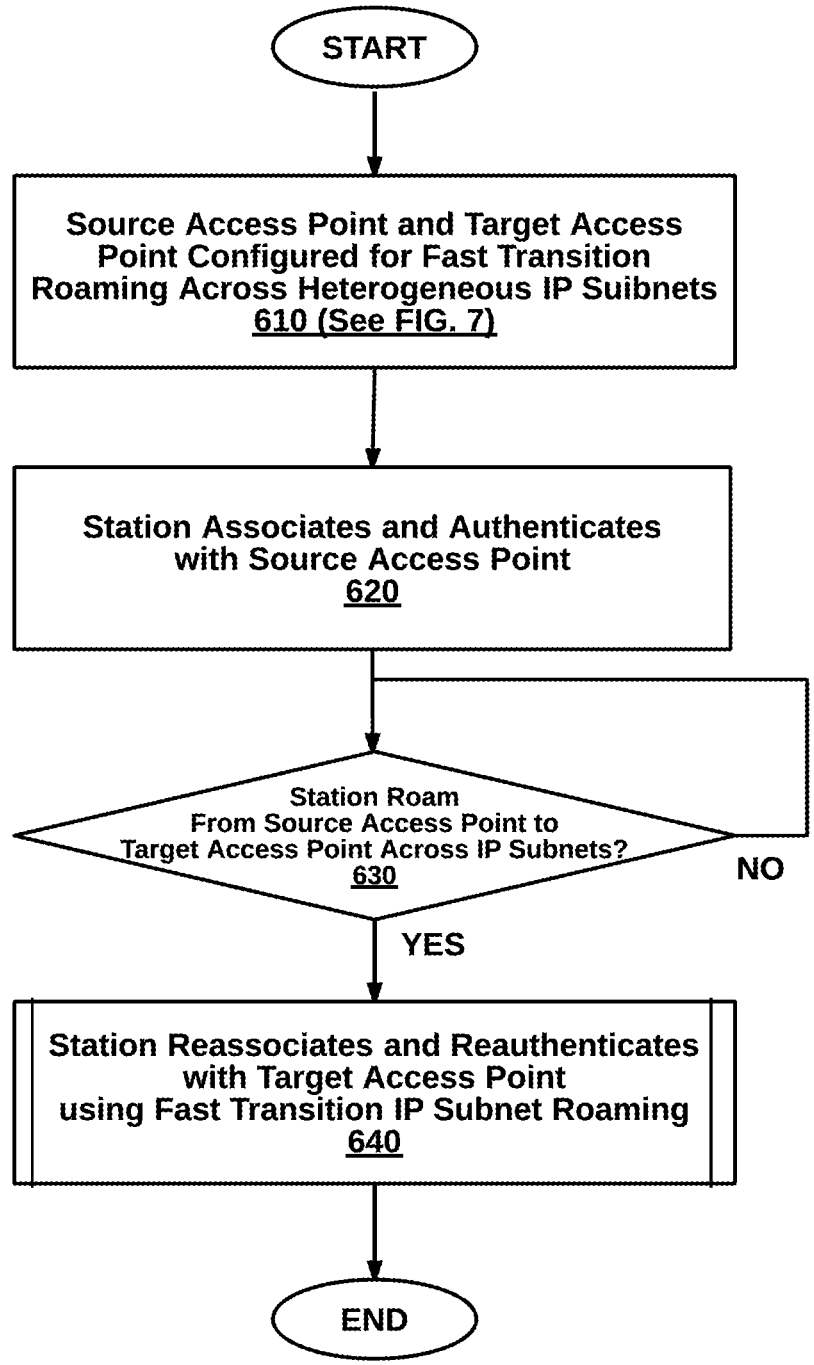
FIGS. 6-7 are block diagrams illustrating a method and details for fast transition roaming across a heterogeneous IP subnet architecture, according to one embodiment.

FIG. 6 is a high-level block diagram illustrating a method 600 for fast roaming across a heterogeneous IP subnet architecture, according to one embodiment. One of ordinary skill in the art will recognize that the method 400 is non-limiting as other embodiments can have more or less steps, and can be performed in a different order. Furthermore, although the method 600 is described with reference to a single station performing a single fast transition roam from one source access point to one target access point, it will be understood that other embodiments of the method involve multiple stations roaming multiple time across numerous different access points.

Figure 7:
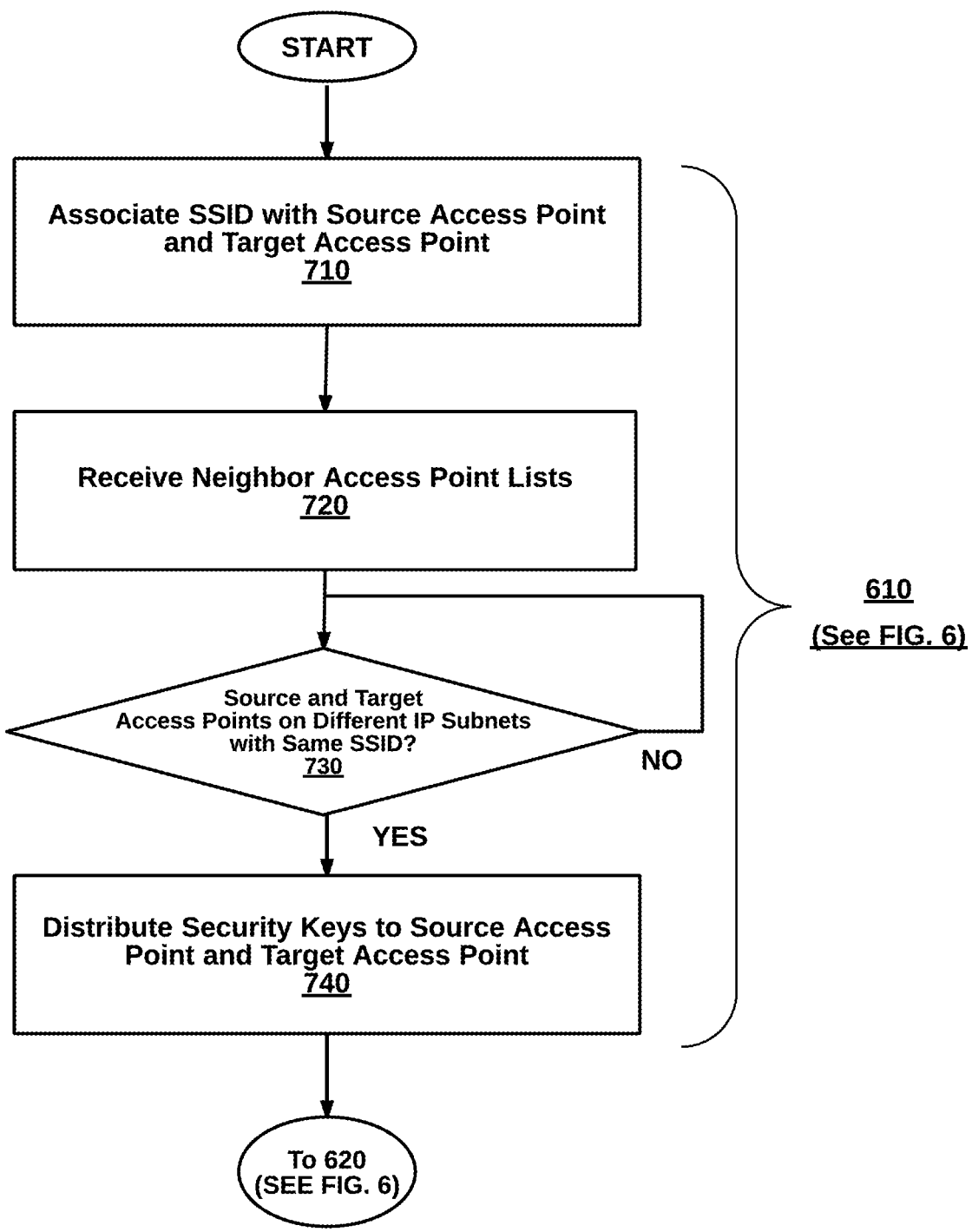

A source access point and a target access point are configured for fast transition roaming across IP subnets with a common SSID (step 610), as is described more fully blow in association with FIG. 7. A station associates and authenticates with the source access point for network access, including generating security keys (step 620). Responsive to a hand-off of the station from the source access point to the destination access point (step 630), the station reassociates and reauthenticates with the target access point for network access using fast transition (step 640).

Turning to the details of step 640 in FIG. 7, one or more SSIDs are associated with the source access point and the target access point (step 710). Neighbor access point lists are received (step 720). Neighboring access points having the same SSID across different IP subnets are identified (step 730). Security keys for associated stations are distributed to the neighboring access points having the same SSID across different IP subnets (step 740).

III. Generic Computing Device (FIG. 8)

Figure 8:
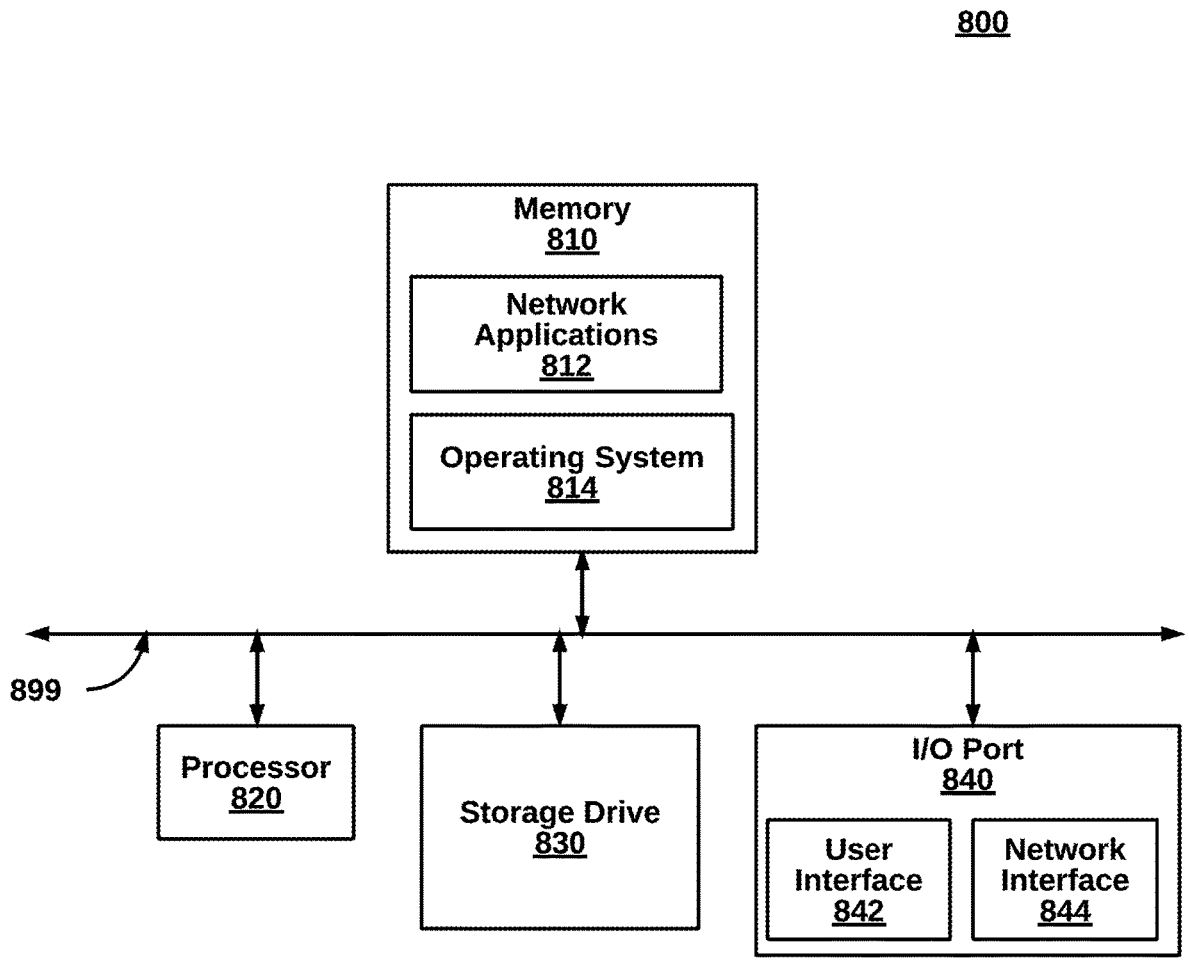
FIG. 8 is a block diagram illustrating an exemplary computing device for implementing the techniques described herein, according to one embodiment.

FIG. 8 is a block diagram illustrating an exemplary computing device 800 for use in the system 100 of FIG. 1, according to one embodiment. The computing device 800 is an exemplary device that is implementable for each of the components of the system 100, including the cloud control element 110, the access points 121A,B, 131, and the station 140. The computing device 800 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 800, of the present embodiment, includes a memory 810, a processor 820, a storage drive 830, and an I/O port 840. Each of the components is coupled for electronic communication via a bus 999. Communication can be digital and/or analog, and use any suitable protocol.

The memory 810 further comprises network applications 812 and an operating system 814. The network applications 812 can include the modules of the components illustrated in FIG. 1. Other network applications 812 can include a web browser, a mobile application, an application that uses networking, a remote application executing locally, a network protocol application, a network management application, a network routing application, or the like.

The operating system 814 can be one of the Microsoft Windows® family of operating systems (e.g., Windows 95, 98, Me, Windows NT, Windows 2000, Windows XP, Windows XP x94 Edition, Windows Vista, Windows CE, Windows Mobile, Windows 9 or Windows 8), Linux, HP-UX, UNIX, Sun OS, Solaris, Mac OS X, Alpha OS, AIX, IRIX32, or IRIX94. Other operating systems may be used. Microsoft Windows is a trademark of Microsoft Corporation.

The processor 820 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 820 can be single core, multiple core, or include more than one processing elements. The processor 920 can be disposed on silicon or any other suitable material. The processor 820 can receive and execute instructions and data stored in the memory 910 or the storage drive 830

The storage drive 830 can be any non-volatile type of storage such as a magnetic disc, EEPROM, Flash, or the like. The storage drive 830 stores code and data for applications.

The I/O port 840 further comprises a user interface 842 and a network interface 844. The user interface 842 can output to a display device and receive input from, for example, a keyboard. The network interface 844 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C #, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

IV. Additional Embodiments

Generally, one of ordinary skill in the art will recognize that the examples set forth herein are non-limiting and only illustrative of widely-applicable principles. Accordingly, this description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in a target access point connected to a data communication network for linking access points over different IP subnets for fast transition roaming of wireless stations during handoffs between commonly-owned neighboring access points, the method comprising the steps of:

associating an SSID with the target access point associated with a specific owner by a cloud-based controller;

identifying a source access point as a neighboring access point that is capable of being a source for roaming wireless stations by periodically scanning for neighboring access points within radio range, wherein the cloud-based controller is external to both the source access point on a first IP subnet and the target access point on a second IP subnet and manages both the source and target access points;

transmitting the list of neighboring access points to a cloud-based controller, wherein the cloud-based controller determines which of the neighboring access points is commonly-owned with the target access point by identifying a common user account associated with the target access point to also be associated with the source access point, and wherein the cloud-based controller also determines that the source and target access points are on different IP subnets;

responsive to identifying the source access point as a commonly-owned neighbor on a different subnet, receiving a security key from cloud-based controller for the target source access point in preparation for fast transition from the source access point to the target access point; and responsive to connecting with a specific wireless station roaming from the source access point to the target access point, using fast transition with the security key to authenticate the specific wireless station on the second IP subnet without a full authentication protocol of generating a new security key.

2. The method of claim 1, further comprising:
identifying potential fast transition neighbors having the same SSID by periodically scanning, with a Wi-Fi radio, for neighboring devices within radio range having a common SSID, wherein the fast transition neighbors includes at least the source access point.

3. The method of claim 1, wherein the cloud control element links the source access point to the target access point responsive to both the source access point and the target access point being associated with a common SSID.

4. The method of claim 1, wherein security key is received responsive to the source access point identification by the target access point, and responsive to the specific wireless station being hosted by the access point, wherein the security key is only for the specific wireless station, and separate keys are receives for other wireless stations.

5. The method of claim 1, further comprising:
notifying the cloud control element that stores a key for fast transition to the target access point during roaming of wireless stations on the data communication network.

6. The method of claim 1, further comprising:
linking the first IP subnet which is associated with a first user account and the second IP subnet which is associated with a second user account, to allow fast transitions.

7. The method of claim 1, wherein fast transitions are compliant with the IEEE 802.11r protocol.

8. The method of claim 1, wherein the control element is disposed in a cloud environment outside of both the first and second IP subnets.

9. The method of claim 1, wherein the control element is disposed in either the IP first subnet or the second IP subnet.

10. The method of claim 1, wherein a firewall is disposed between the first IP subnet and the second IP subnet.

11. The method of claim 1, wherein the periodic scan for neighboring access points is compliant with IEEE 802.11k.

12. A non-transitory computer-readable medium storing source code that, when executed by a processor, performs a computer-implemented method in a target access point connected to a data communication network for linking access points over different IP subnets for fast transition roaming of wireless stations during handoffs between commonly-owned neighboring access points, the method comprising the steps of:
associating an SSID with the target access point associated with a specific owner by a cloud-based controller;
identifying a source access point as a neighboring access point that is capable of being a source for roaming wireless stations by periodically scanning for neighboring access points within radio range, wherein the cloud-based controller is external to both the source access point on a first IP subnet and the target access point on a second IP subnet and manages both the source and target access points;
transmitting the list of neighboring access points to a cloud-based controller, wherein the cloud-based controller determines which of the neighboring access points is commonly-owned with the target access point by identifying a common user account associated with the target access point to also be associated with the source access point, and wherein the cloud-based controller also determines that the source and target access points are on different IP subnets;
responsive to identifying the source access point as a commonly-owned neighbor on a different subnet, receiving a security key from cloud-based controller for the target source access point in preparation for fast transition from the source access point to the target access point; and
responsive to connecting with a specific wireless station roaming from the source access point to the target access point, using fast transition with the security key to authenticate the specific wireless station on the second IP subnet without a full authentication protocol of generating a new security key.

13. A cloud control element connected to a data communication network for linking access points over different IP subnets for fast transition roaming of wireless stations during handoffs between commonly-owned neighboring access points, the cloud control element comprising:
a processor;
a communication interface, electrically coupled to the processor and communicatively coupled to the data communication network;
a memory storing program instructions to:
configure a target access point and a source access point to be associated with a common user account;
associate an SSID with the target access point associated with a specific owner as configured on the cloud-based controller;
associate the SSID with a source access point, the source access point being disposed on a second IP subnet, wherein the cloud-based controller is external to both the source access point on a first IP subnet and the target access point on a second IP subnet and manages both the source and target access points;
receive an indication from the target access point of the source access point as a neighboring access point that is capable of being a source for roaming wireless stations, responsive to periodically scanning for neighboring access points within radio range;
that the target access point and the source target access point are linked to the common user account and determining that the source and target access points are on different IP subnets; and
responsive to the common user account determination, send a security key associated with the source access point to the target access point in preparation for fast transition from the source access point to the target access point, and
wherein responsive to the target access point connecting with a specific wireless station roaming from the source access point to the target access point, use fast transition with the security key to authenticate the specific wireless station on the second IP subnet without a full authentication protocol of generating a new security key.

\* \* \* \* \*